United States Patent
Hseush et al.

(10) Patent No.: US 12,298,997 B1
(45) Date of Patent: May 13, 2025

(54) DATA EXPLORATION APPARATUS, CASCADING DATA EXPLORATION METHOD, AND NON-TRANSITORY COMPUTER READABLE STORAGE MEDIUM THEREOF

(71) Applicant: BigObject Private Limited, Helios (SG)

(72) Inventors: Wenwey Hseush, Taipei (TW); Ya Chu Chen, Taipei (TW); Tyng-Rong Roan, Taipei (TW)

(73) Assignee: BigObject Private Limited, Helios (SG)

( * ) Notice: Subject to any disclaimer, the term of this patent is extended or adjusted under 35 U.S.C. 154(b) by 0 days.

(21) Appl. No.: 18/749,976

(22) Filed: Jun. 21, 2024

(51) Int. Cl.
*G06F 16/26* (2019.01)
*G06F 16/22* (2019.01)
*G06F 16/28* (2019.01)

(52) U.S. Cl.
CPC ............ *G06F 16/26* (2019.01); *G06F 16/221* (2019.01); *G06F 16/2282* (2019.01); *G06F 16/287* (2019.01)

(58) Field of Classification Search
CPC ................................ G06F 16/26; G06F 16/221
USPC .......................................................... 707/737
See application file for complete search history.

(56) References Cited

U.S. PATENT DOCUMENTS

| | | | |
|---|---|---|---|
| 2014/0280193 A1* | 9/2014 | Cronin ................ | G06F 16/2455 707/741 |
| 2014/0344235 A1* | 11/2014 | Zarpas ..................... | G06F 16/22 707/696 |
| 2016/0239766 A1* | 8/2016 | Cameron ............ | G06F 3/04847 |

* cited by examiner

*Primary Examiner* — Muluemebet Gurmu
(74) *Attorney, Agent, or Firm* — PLEECHAE IP, LLC

(57) ABSTRACT

A data exploration apparatus is interactively operated by a user conducting a mission including explorations, $T_1$, $T_2$, ..., $T_N$, to cross-analyze tabular datasets, $D_1$, $D_2$, ..., $D_N$, respectively. The apparatus starts with n=1 in response to the initiation of the mission to launch an exploration $T_n$, enable the display device to display a working scene $S_n$ for the exploration $T_n$, perform a sequence of operations on the working dataset $W_n$ corresponding to the exploration $T_n$, and then refresh the working scene $S_n$. In response a GUI action, an interrupt operation is performed to escape from the exploration $T_n$, launch an exploration $T_m$ with the target of interest $TOI_{(n,m)}$ to explore the related tabular dataset $D_m$, and enable the display device to display a working scene $S_m$ for the exploration $T_m$.

21 Claims, 12 Drawing Sheets

DATA EXPLORATION APPARATUS, CASCADING DATA EXPLORATION METHOD, AND NON-TRANSITORY COMPUTER READABLE STORAGE MEDIUM THEREOF

BACKGROUND

1. Field of the Invention

The present invention relates to a data exploration apparatus, cascading data exploration method, and non-transitory computer readable storage medium thereof. More specifically, the present invention relates to a data exploration apparatus, cascading data exploration method, and non-transitory computer readable storage medium thereof that can be interactively operated by a user conducting a mission including a plurality of explorations to cross-analyze a plurality of tabular datasets respectively.

2. Background of Art

With the advent of the big data era, more and more parties (e.g., persons, enterprises, and organizations) collect various kinds of data for analysis and then make decisions based on analysis results. However, high-quality decisions are often made together with external data such as open data and third-party market data. As the scope of data owned by a party is quite limited, sharing data among parties to make more accurate decisions is the trend.

Conventionally, sharing data among parties is achieved by providing files to be downloaded or to be accessed via Application Programming Interfaces (APIs), which, however, have several drawbacks. First, data owners may lose their unique data ownership because the datasets will be possessed by other parties after sharing, who may further replicate and/or redistribute the data sets to others. Hence, most data owners are hesitant to share their data. Second, since data owners may lose their unique data ownerships after sharing data, they tend to provide data from their viewpoints rather than from users' viewpoints. As a consequence, a user that is looking for useful information may derive data that is not ready or not easy to use. Every user who accesses data is required to take time and data-processing skills to prepare data to something ready. Third, it is difficult to a user to analyze across multiple datasets owned by different owners without putting together all datasets in one database and aligning the common attributes for cross referencing. It is again a very time-consuming and labor-intensive task to retrieve and prepare multiple datasets from different data sources. That is, cross analysis on multiple datasets belonging to different owners is difficult to be achieved with today's means of data sharing (i.e., file downloading and API). Forth, file-based data sharing imposes constraints on access control at file level for all users, who have no choice but download a file as a whole. Loading a large data file with a great number of dimensions (i.e., columns) is a time-consuming task and requires sufficient local storage to retain the downloaded file, even though the data users use only a very small portion of downloaded data in their applications.

Consequently, to facilitate the usage of data, a cascading data exploration mechanism that can separate data ownership from the use of data and have a user-friendly interface for finding out synergetic insights from multiple datasets located in different sites while protecting data from being copied, downloading, or unauthorized disclosure is need.

SUMMARY OF THE INVENTION

Provided is a data exploration apparatus being interactively operated by a user conducting a mission including a plurality of explorations, $T_1, T_2, \ldots, T_N$, to cross-analyze a plurality of tabular datasets, $D_1, D_2, \ldots, D_N$, respectively. The data exploration apparatus includes at least one storage device, a display device, and at least one processor, wherein the at least one processor is electrically connected to the at least one storage device and the display device. The at least one processor is configured to:

start with n=1 in response to the initiation of the mission to:
  (1) launch an exploration $T_n$, and the exploration $T_n$ is a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided, and
  (2) enable the display device to display a working scene $S_n$ for the exploration $T_n$, wherein the working scene $S_n$ includes a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format,
    in response to a sequence of selections of the GUI action elements and the column names of the tabular dataset $D_n$ from the working scene $S_n$, perform a sequence of operations on the working dataset $W_n$ and refresh the working scene $S_n$ after the sequence of operations is performed,
    in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names,
  (1) generating an interrupt command so that an interrupt operation is performed to escape from the exploration $T_n$, wherein a target of interest $TOI_{(n,m)}$ is derived from the working dataset $W_n$ to include distinct data values of the first related column group of the tabular dataset $D_n$,
  (2) launch an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$, and
  (3) enable the display device to display a working scene $S_m$ for the exploration $T_m$.

Also provided is a cascading data exploration method for use in a cascading data exploration system including at least one data exploration apparatus. A first data exploration apparatus of the at least one data exploration is interactively operated by a user conducting a mission including a plurality of explorations, $T_1, T_2, \ldots, T_N$, to cross-analyze a plurality of tabular datasets, $D_1, D_2, \ldots, D_N$, respectively. The first data exploration apparatus stores the tabular dataset $D_1$ and has a display device to interface with the user. The cascading data exploration method includes the following steps:

starting with n=1, in response to the initiation of the mission, for the following steps:
launching an exploration $T_n$, and the exploration $T_n$ being a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided; and
displaying, on the display device, a working scene $S_n$ for the exploration $T_n$, wherein the working scene $S_n$ includes a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format;
wherein the cascading data exploration method further includes the following steps in response to a sequence of selections of the GUI action elements and the column names of the tabular dataset $D_n$ from the working scene $S_n$:
performing a sequence of operations on the working dataset $W_n$; and
refreshing the working scene $S_n$ on the display device after the sequence of operations is performed;
wherein the cascading data exploration method further includes the following steps in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names:
generating an interrupt command so that an interrupt operation is performed to escape from the exploration $T_n$, wherein a target of interest $TOI_{(n,m)}$ is derived from the working dataset $W_n$ to include distinct data values of the first related column group of the tabular dataset $D_n$;
launching an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$; and
displaying a working scene $S_m$ for the exploration $T_m$ on the display device.

Also provided is a non-transitory computer readable storage medium, which stores a computer program including a plurality of codes. The computer program executes a cascading data exploration method after the codes are loaded into a cascading data exploration system. A first data exploration apparatus of the cascading data exploration system is interactively operated by a user conducting a mission including a plurality of explorations, $T_1, T_2, \ldots, T_N$, to cross-analyze a plurality of tabular datasets, $D_1, D_2, \ldots, D_N$, respectively. The first data exploration apparatus stores the tabular dataset $D_1$ and has a display device to interface with the user. The cascading data exploration method includes the following steps:

starting with n=1, in response to the initiation of the mission, for the following steps:
launching an exploration $T_n$, and the exploration $T_n$ being a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided; and
enabling the display device to display a working scene $S_n$ for the exploration $T_n$, wherein the working scene $S_n$ includes a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format;
wherein the cascading data exploration method further includes the following steps in response to a sequence of selections of the GUI action elements and the column names of the tabular dataset $D_n$ from the working scene $S_n$:
performing a sequence of operations on the working dataset $W_n$; and
refreshing the working scene $S_n$ on the display device after the sequence of operations is performed;
wherein the cascading data exploration method further includes the following steps in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names:
generating an interrupt command so that an interrupt operation is performed to escape from the exploration $T_n$, wherein a target of interest $TOI_{(n,m)}$ is derived from the working dataset $W_n$ to include distinct data values of the first related column group of the tabular dataset $D_n$;
launching an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$; and
displaying a working scene $S_m$ for the exploration $T_m$ on the display device.

According to the present invention, the tabular datasets, $D_1, D_2, \ldots, D_N$ may be stored in the same data exploration apparatus or different data exploration apparatuses. Hence, data exploration can be performed cross datasets and even cross-sites (i.e., cross data exploration apparatuses). The purpose of having cross-sites data exploration is to ignite the power of cross-analyzing two or more independent tabular datasets, managed by different data owners and living far away in very heterogeneous environments. It enables spontaneous as well as planned data queries across various data planets without the need to share or unify raw data, thus protecting data from being copied, downloading, or unauthorized disclosure.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the data exploration apparatus, cascading data exploration method, and non-transitory computer readable storage medium thereof of the present invention will be explained regarding certain embodiments. However, these embodiments are not intended to limit the present invention to any specific environment, application, or implementation described in these embodiments. Therefore, descriptions of these embodiments illustrate rather than limit the scope of the present invention. It should be noted that elements unrelated to the present invention are omitted from the depiction in the following embodiments and the attached drawings. Dimensions of and dimensional scales between individual elements in the attached drawings are provided only for ease of depiction and illustration but not to limit the scope of the present invention. Moreover, unless additionally explained, the expressions "a," "the," or the like recited in the specification and the claims should include both the singular and the plural forms.

The key idea of the present invention is to provide mechanisms that a data owner can encapsulate and host a structure of data in a data exploration apparatus, while allowing users to interactively operate the data exploration apparatus so as to conduct a mission including a plurality of explorations, denoted as $T_1, T_2, \ldots, T_N$, to cross-analyze a plurality of tabular datasets, denoted as $D_1, D_2, \ldots, D_N$, respectively to uncover patterns, characteristics, and points of interest in an unplanned, unstructured, but controllable way. The variable N is a positive integer greater than one.

Data Planet

A data exploration apparatus provided by the present invention can be considered as a Data Planet (DP). The two terms "data exploration apparatus" and "data planet" are used interchangeably in the present application. ADP is a Graphic User Interface (GUI)-front data object that (i) encapsulates one or more tabular datasets, referred to as raw data and (ii) supports an interface of methods for users or other DPs to access to and interact with the DP. In some embodiments, each DP may have (a) a unique name such as Uniform Resource Identifier (URI) in World Wide Web (WWW), (b) a subject, and (c) a text description. The interface of methods is designed to be necessary and sufficient and is the only way to access the DP while protecting the raw data from being copied, downloading, leaking, or unauthorized disclosure.

Figure 1:
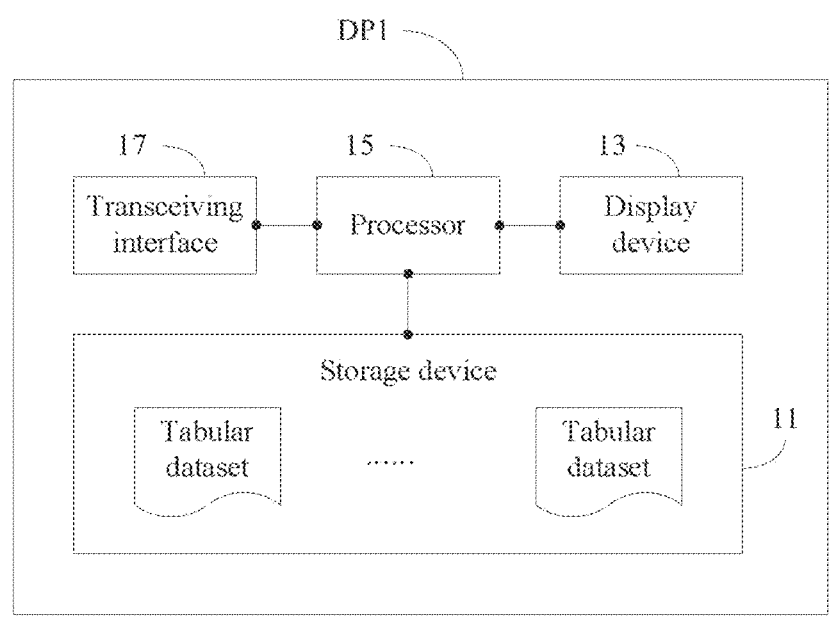
FIG. 1 illustrates the hardware structure of a data exploration apparatus DP1 in some embodiments of the present invention.

Please refer to FIG. 1 for the hardware structure of a data exploration apparatus DP1 in some embodiments of the present invention. The data exploration apparatus DP1 includes a storage device 11, a display device 13, and a processor 15, wherein the processor 15 is electrically connected to the storage device 11 and the display device 13. In some embodiments, the data exploration apparatus DP1 may include more than one processor and/or more than one storage device. For those embodiments, the processor(s) and the storage device(s) are electrically connected.

The storage device 11 is configured to store one or more tabular datasets and may be a hard disk (e.g., solid state disk) or other non-transitory computer readable storage medium/device that can store various kinds of digital data and well-known to those skilled in the art. The display device 13 is configured to interface with a user and may be a Liquid Crystal Display (LCD) device, an Organic Light Emitting Diode (OLED) display device, an Active Matrix Organic Light Emitting Diode (AMOLED) display device, a Micro Light Emitting Diode (Micro LED) display device, or other display device that is well-known to those skilled in the art. The processor 15 may be any kind of processing unit, central processing unit (CPU), microprocessor, digital signal processor (DSP), or any kind of computing device with similar functions and well-known to those skilled in the art.

In some embodiments, the data exploration apparatus DP1 may further include a transceiving interface 17, wherein the transceiving interface 17 is electrically connected to the processor 15. The transceiving interface 17 maybe a wired interface or a wireless interface, which is configured to connect to a network (e.g., an Internet, a local area network) for transmitting signals and/or data to other data exploration apparatus or receiving signals and/or data from other exploration apparatus.

Relatedness

In the present invention, every tabular dataset may have a fixed number of columns and a changing number of rows. Two tabular datasets are related if they have column groups having the same meaning and the same data representation format. It is noted that a column group may include one or more columns.

Some examples regarding related tabular datasets are given herein for better understanding. In one example, the tabular datasets $D_n$ and $D_m$ are related because each of the tabular datasets $D_n$ and $D_m$ has a column group for representing time in the data representation format "MM-DD-YYYY" In another example, the tabular datasets $D_p$ and $D_q$ are related because each of the tabular datasets $D_p$ and $D_q$ has a column group for representing cities in text format such as "NYC" and "New York City, NY" In some embodiments, this can be achieved by the technologies such as knowledge graph or large language model.

Data Galaxy

Figure 2:
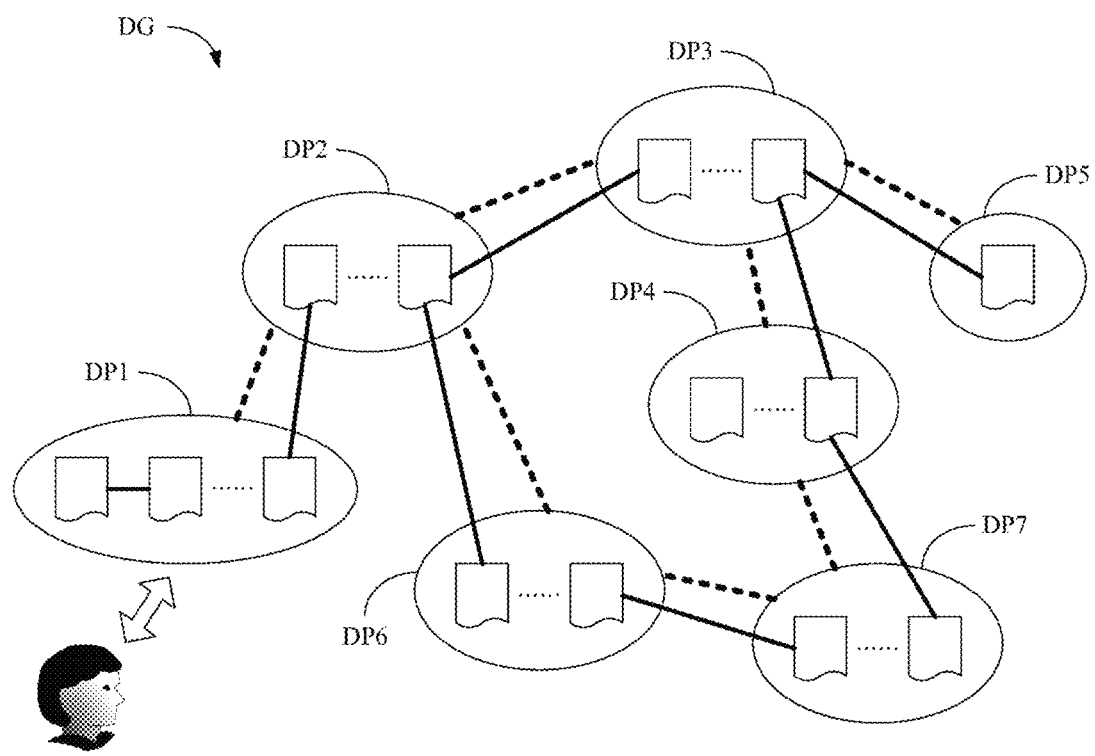
FIG. 2 illustrates the concept of an exemplary data galaxy.

A data galaxy is a network of related DPs, wherein relatedness links are established between DPs. Two DPs are related if at least one tabular dataset of one DP is related to one tabular dataset in the other DP. FIG. 2 illustrates the concept of an exemplary data galaxy DG, which includes seven DPs (i.e., the data exploration apparatuses DP1, DP2, DP3, DP4, DP5, DP6, and DP7). In FIG. 2, each oval represents a DP, each solid line represents a relatedness link between two tabular datasets (i.e., two tabular datasets connected by a solid line are related), and each dotted line represents a relatedness link between two DPs (i.e., two DPs connected by a dotted line are related). Although seven DPs are shown in FIG. 2, it is noted that the present invention does not limit the number of DPs that a data galaxy can include to any specific number. It is also noted that the hardware structure of each of the data exploration apparatuses DP2, . . . , and DP7 may be similar to that shown in FIG. 1.

As described above, a data exploration apparatus provided by the present invention can be considered as a DP. Hence, a cascading data exploration system including a plurality of data exploration apparatuses can be considered as a data galaxy. In the present application, the two terms "cascading data exploration system" and "data galaxy" are used interchangeably.

Data Exploration

In the field of explorative data analytics that facilitates users to delve into the complexity of data and navigate its dimensions, the primary objective is to aim at discerning patterns and trends, specifically focusing investigative efforts on the target of interest for extracting valuable insights. Data exploration is a reasoning process that enables users to interactively examine one or more tabular datasets and their columns, step by step, narrowing down the possibilities until something interesting or suspicious is discovered. The present invention further pushes the limit of the traditional data exploration for cross data analytics without exchanging raw data by allowing a seamless and explorative journey into an unknown space of datasets, which may be possessed by third parties and managed in a remote and heterogeneous environment, as long as the datasets can be located and relatedness links can be established. In the present invention, such a process is started from one tabular dataset by a user with a mission such as a high-level goal (e.g., detecting anomalous situations, searching for suspects, etc.) or a specific analytic question in mind (e.g., finding out the top three cities with the highest living expenses).

In the present invention, the user interactively operates the data exploration apparatus DP1 to conduct a mission. In response to the initiation of the mission, the processor 15 of the data exploration apparatus DP1 starts with n=1 to launch an exploration $T_n$ and enables the display device 13 of the data exploration apparatus DP1 to display a working scene $S_n$ for the exploration $T_n$.

The exploration $T_n$ is a task with an optional filter (will be explained later) to explore a tabular dataset $D_n$. When launching the exploration $T_n$, a working dataset $W_n$ for the exploration $T_n$ to operate on will be initially derived by applying the filter to the tabular dataset $D_n$ or from the tabular dataset $D_n$ if no filter is provided. Specifically, if the exploration $T_n$ is the first exploration task (i.e., n=1) among a sequence of explorations (such as $T_1$ among $T_1$, $T_2$, . . . , $T_N$), no filter will be provided and, hence, the working dataset $W_n$ will be initially derived from the tabular dataset $D_n$ directly (i.e., the content of the working dataset $W_n$ will be the same as the content of the tabular dataset $D_n$). If the exploration $T_n$ is not the first exploration task among a sequence of explorations, the working dataset $W_n$ will be initially derived by applying the filter to the tabular dataset $D_n$. In either case, the data exploration apparatus that stores the tabular dataset $D_n$ generates the working dataset $W_n$. For example, the tabular dataset $D_1$ is stored in the data exploration apparatus DP1 and, hence, the processor 15 of the data exploration apparatus DP1 generates the working dataset $W_1$.

The display device 13 of the data exploration apparatus DP1 (i.e., the apparatus that the user interactively operates) displays the working scene $S_n$. The working scene $S_n$ includes a statistic graph for the working dataset $W_n$, a plurality of column names of the tabular dataset $D_n$, a plurality of GUI action elements, and a plurality of column names of a related tabular dataset $D_m$ if the related tabular dataset $D_m$ is specified. As column names of related tabular dataset(s) are also provided (if there is one or more) to the user, data exploration may be performed in a cascading manner (i.e., from tabular dataset to tabular dataset through the relatedness therebetween).

Figure 3:
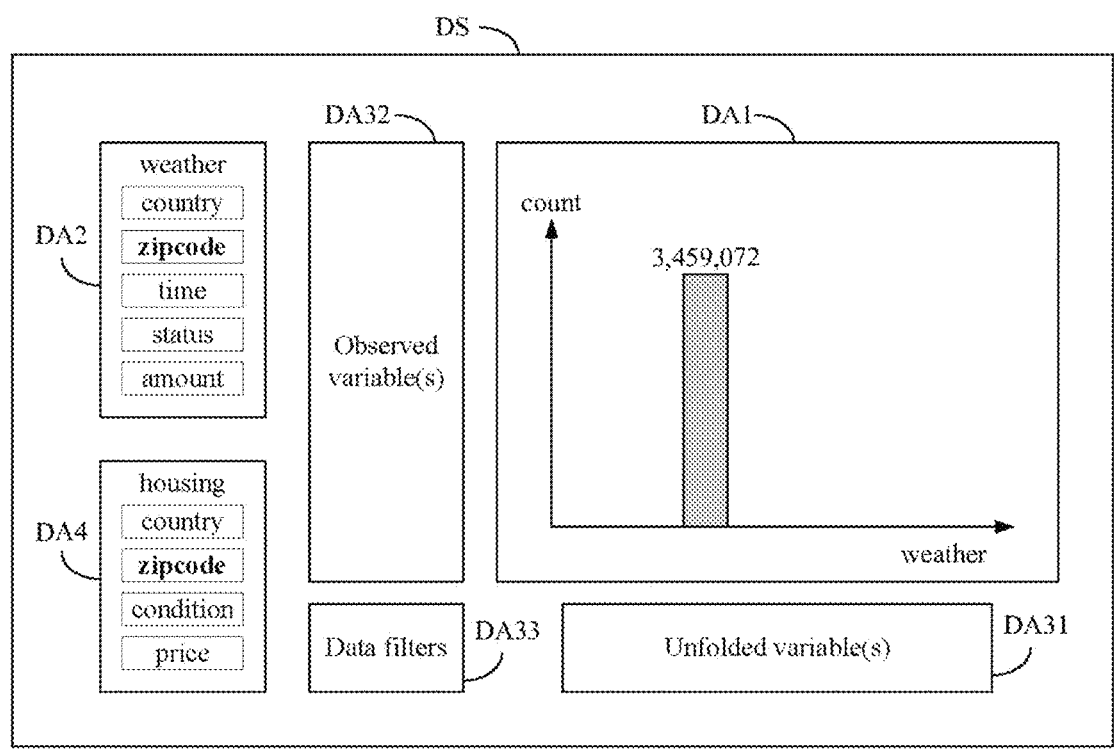
FIG. 3 illustrates an exemplary working scene $S_n$ displayed on the display device 13.

Please refer to FIG. 3 for an exemplary working scene $S_n$ displayed on the display device 13. In this example, the tabular dataset $D_n$ being explored is named as "weather" and includes five columns named as "country," "zipcode," time," "status," and "amount." The tabular dataset $D_n$ has a related tabular dataset $D_m$, which is named as "housing" and includes four columns named as "country," "zipcode," "condition," and "price." The tabular datasets $D_n$ and $D_m$ are related because their columns "zipcode" are related. The display screen DS of the display device 13 includes a display area DA1 for showing a statistic graph for the working dataset $W_n$, a display area DA2 for showing the column names of the tabular dataset $D_n$, three display areas DA31, DA32, DA33 for showing GUI action elements, and a display area DA4 for showing the column names the related tabular dataset $D_m$. To be more specific, the display area DA31 is for holding the control column(s) (X-axis) being selected, indicating the domain the user likes to examine, the display area DA32 is for holding the result column(s) (the Y-axis) being selected, indicating the results the user likes to observe regarding to the values of the control column(s) (X-axis), and the display area DA33 is for defining and holding data filters on the tabular dataset $D_n$, which are constructed by predefined functions or operators with columns from the display area DA2.

Explorative Methods

The present invention provides a set of explorative methods for users or other DPs to access to and interact with the DP. The following explorative methods are provided as examples. It is noted that the present invention does not limit the explorative methods to the following items.

(i) Unfold X: Pick and break down a column, say X, of a tabular dataset into groups by values to reveal the underlying properties. For example, column Gender is selected and broken down into two groups, male and female, and column Age is broken down into ten groups 1-10, 11-20, . . . , 91-100. The column may be referred to as the unfolded column(s) or X-column(s). In the example shown in FIG. 3, "unfold X" can be achieved by selecting a column name into the display area DA31.

(ii) Observe Y: Pick and visually observe the values of one column, say Y, in relation to the unfolded groups of the X-column(s) to demonstrate the relationship between these columns in basic or aggregative forms (e.g., count, average, max, min, etc.). For example, column Salary is selected to reveal the average salary for unfolded groups, male and female. The columns are referred to as the observed columns or Y-columns. In the example shown in FIG. 3, "observe Y" can be achieved by selecting a column name into the display area DA32.

(iii) Examine X-Y: Interactively inspect X-column(s) and Y-column(s) to identify interesting patterns or anomalous conditions. By manipulating the twists and turns (e.g., side-by-side comparison, normalization, ordering, clustering, regrouping, scaling, pivoting, baselining, quantization, or other visual transformations, etc.), one can visualize the interdependencies among variables in different understandings and from diverse perspectives, to reveal multifaceted insights from the dataset. This explorative method aims to inspect data from different angles without having to add or remove interest columns (i.e., X's and Y's).

(iv) Quit: Quit the exploration if something interesting is found or nothing can be further explored.

(v) Data filter: Eliminate and reduce the working dataset by filtering out uninteresting rows or unlikely groups/ranges to focus on key elements (i.e., narrowing down the scope). In the example shown in FIG. 3, "data filter" can be achieved by (a) selecting one or more unfolded groups in the display area DA31, (b) setting filtering conditions in the display area DA32, or (c) applying one or more selected columns to a function in the display area DA33.

Process of Exploration

In the present invention, an exploration can be considered as a series of actions/queries on data, which is a sequence of selections of one or more of the GUI action elements and the column names of the tabular dataset $D_n$ from the working scene $S_n$. The invocation of an action/query results in one of the following cases: (i) the target for the search or the answer for the analytic question, leading to the end of the exploration, (ii) a hint to determine the next step or a related dataset to be continued, and (iii) a situation to back to a previous state. In response to the sequence of selections of the GUI action elements and the column names of the tabular dataset $D_n$ from the working scene $S_n$, the data exploration apparatus that stores the tabular dataset $D_n$ performs a sequence of operations on the working dataset $W_n$ (by its processor) and the data exploration apparatus DP1 (i.e., the apparatus that the user interactively operates) refreshes the working scene $S_n$ displayed on the display device 13 (by the processor 15) after the sequence of operations is performed. It is noted that at any point of an exploration, there is a corresponding working dataset on which the users explore and investigates. The working dataset is changing step by step, query by query.

Figure 4:
FIG. 4 illustrates an exemplary tabular dataset TD1.
Figure 5:
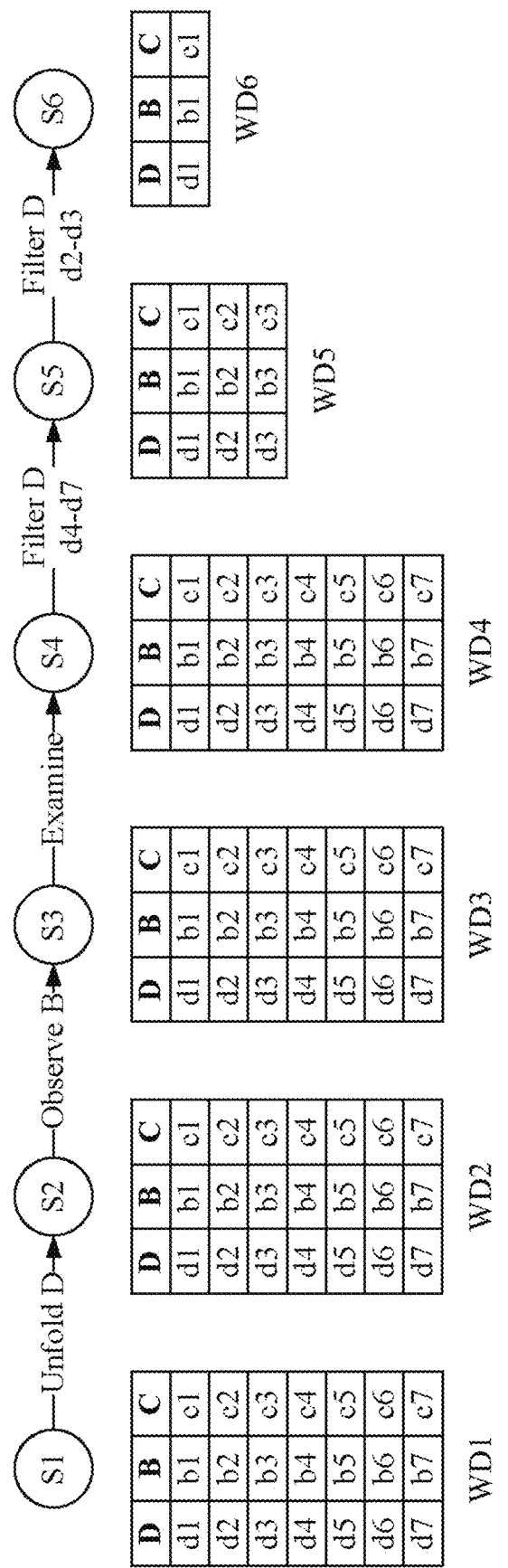
FIG. 5 illustrates an exemplary process of exploring the exemplary tabular dataset TD1.

FIG. 5 illustrates an exemplary process of exploring the exemplary tabular dataset TD1 shown in FIG. 4. When the processor 15 of the data exploration apparatus DP1 launches an exploration $T_1$ (i.e., a task to explore the tabular dataset TD1), a working dataset WD1 for the exploration to operate on is initially derived from the tabular dataset TD1.

Starting from the working dataset WD1 (may be considered as the state S1), the exploration, upon the invocation of each action/query (by clicking one or more of the column names of the tabular dataset TD1 and the GUI action elements shown on the display device 13), moves from one state to another, while resulting in the outcomes of the action/query. Each state of the exploration is represented by one working dataset. In this example, performing "unfold column D" at the state S1 results in the state S2 (represented by the working dataset WD2), performing "observe column B" at the state S2 results in the state S3 (represented by the working dataset WD3), performing "examine column D and column B" at the state S3 results in the state S4 (represented by the working dataset WD4), performing "data filter" by filtering out the values "d4" to "d7" corresponding to the column "D" at the state S4 results in the state S5 (represented by the working dataset WD5), and performing "data filter" by filtering out the values "d2" to "d3" at that state S5 results in the state S6 (represented by the working dataset WD6).

Target of Interest

Among the things that the user is interested in, he or she may want to further track and trace certain information over time or over space (i.e., in different tabular datasets). Target (s) of Interest (TOI) is used to refer to the specific objects, persons, or things that a particular interest is focused on or directed towards. A TOI is a subset of a working dataset that contains the targets that the user wishes to learn about from the related tabular dataset, and if provided, auxiliary information that the user likes to share with while exploring the related tabular dataset.

A TOI may be generated when a user shows an interest on a related tabular dataset (either on the same data exploration apparatus or on a different data exploration apparatus). In the present invention, when a user is exploring the tabular dataset $D_n$, he or she may show an interest on a related tabular dataset $D_m$ by one of the following ways: (a) a selection (e.g., clicking by a mouse) of a prime column name of the related tabular dataset $D_m$ from the working scene $S_n$ and (b) a selection (e.g., clicking by a mouse) of the related tabular dataset $D_m$, wherein the column names of the second related column group of the related tabular dataset $D_m$ are the prime column names. A target of interest $TOI_{(n,m)}$ is derived from the working dataset W to include distinct data values of the first related column group of the tabular dataset $D_n$. In some embodiments, the target of interest $TOI_{(n,m)}$ may further include data of at least one other column in the working dataset $W_n$. Such auxiliary information is specified by the user. The target of interest $TOI_{(n,m)}$ is generated by the processor of the data exploration apparatus that stores the tabular dataset $D_n$.

Figure 6A:
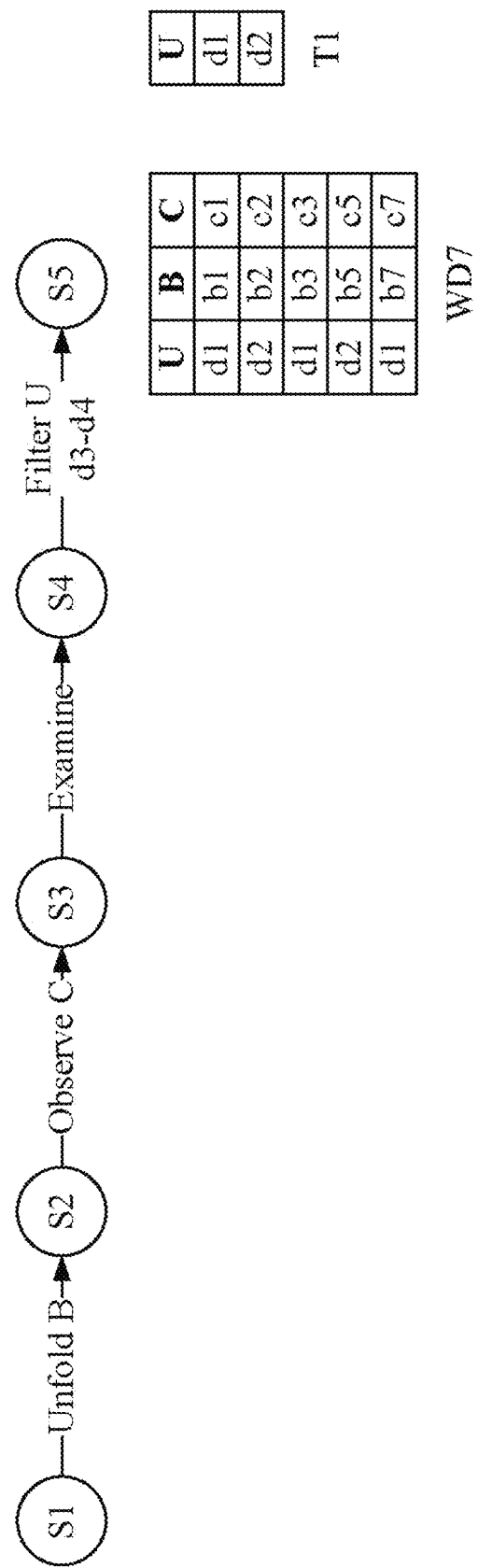
FIG. 6A illustrates an example of the target of interest T1.

Please refer to FIG. 6A for an example of the target of interest $T_n$. In this example, a user explores a tabular dataset (not shown) by performing "unfold column B," performing "observe column C," performing "examine column B and column C," and then performing "data filter" by filtering out the values "d3" to "d4" corresponding to the column "U" which results in the working dataset WD7. At this point, a user shows an interest on a related tabular dataset, wherein the two tabular datasets are related because of the related column "U." In response, the target of interest $T_n$ that include distinct data values of the first related column group (i.e., the column "U") is generated from the working dataset WD7.

Figure 6B:
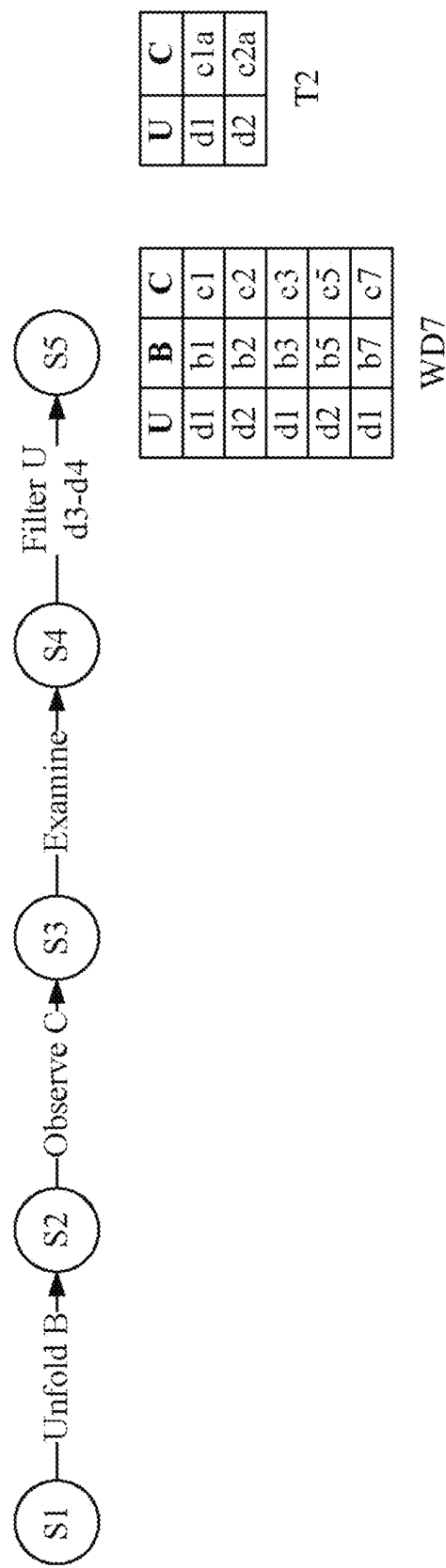
FIG. 6B illustrates another example of the target of interest T2.

Please refer to FIG. 6B for another example of the target of interest T2. The difference between the two target of interests T1 and T2 is that the target of interest T2 further includes data of the column "C" in the working dataset $W_n$. In the target of interest T2, the value "c1a" corresponding to the value "d1" may be derived by applying a function to all the values in the column "C" that corresponds to d1 (e.g., averaging "c1," "c3," and "c7") from the working dataset WD7, and the value "c2a" corresponding to the value "d2" may be derived by applying the same operation to all the values in the column "C" that corresponds to d2 (e.g., averaging "c2" and "c5") from the working dataset WD7.

Escaping from one tabular dataset to explore related tabular dataset with TOI

When a user shows an interest on a related tabular dataset $D_m$ (either on the same data exploration apparatus or on a different data exploration apparatus) during the exploration of the tabular dataset $D_n$, the processor that stores the tabular dataset $D_n$ performs the following operations. It first generates the target of interest $TOI_{(n,m)}$, performs an interrupt operation to escape from the exploration $T_n$ in response to an interrupt command, and then launches an exploration $T_m$ with the target of interest $TOI_{(n,m)}$ and the prime column names of the related tabular dataset $D_m$ to explore the related tabular dataset $D_m$. It is noted that the interrupt command is generated by the processor 15 of the data exploration apparatus DP1. At the launch of exploration $T_m$, it also notifies the processor 15 of the data exploration apparatus DP1 to enable the display device 13 to display a working scene $S_m$ for the exploration $T_m$.

In response to launching the exploration $T_m$ with the target of interest $TOI_{(n,m)}$, the processor of the data exploration apparatus that stores the related tabular dataset $D_m$ applies the target of interest $TOI_{(n,m)}$ (can be considered as a filter) to the related tabular dataset $D_m$ to derive a working dataset $W_m$ for the exploration $T_m$. The working dataset $W_m$ is a subset of the related tabular dataset $D_m$ with data values of the second related column group of the related tabular dataset $D_m$ contained in the target of interest $TOI_{(n,m)}$.

Figure 7:
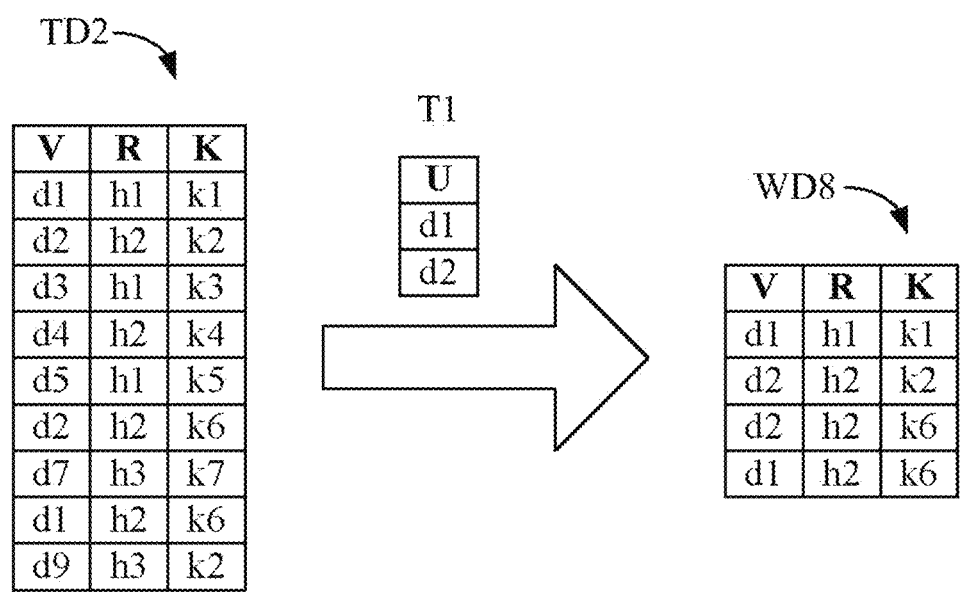
FIG. 7 illustrates an example regarding generating the working dataset $W_m$ for the exploration $T_m$ according to the target of interest $TOI_{(n,m)}$.

Please refer to FIG. 7 for an example regarding generating the working dataset $W_m$ for the exploration $T_m$ according to the target of interest $TOI_{(n,m)}$. In this example, the tabular dataset TD2 is the related tabular dataset and the column named "V" forms the related column group. Applying the target of interest T1 to the tabular dataset TD2 results in the working dataset WD8 (i.e., the working dataset $W_m$) for the exploration $T_m$.

Cross-Dataset Data Exploration on the Same DP; Asynchronous Mode

In some embodiments, the tabular dataset $D_n$ and the related tabular dataset $D_m$ are stored in the same data exploration apparatus and the explorations $T_n$ and $T_m$ are performed asynchronously. Please note that the data exploration apparatus that stores the tabular datasets $D_n$ and $D_m$ may be the one that the user interactively operates (i.e., the data exploration apparatus DP1) or other data exploration apparatus.

In those embodiments, the processor of the data exploration apparatus that stores the tabular datasets $D_n$ and $D_m$ runs the exploration $T_m$ to filter the related tabular dataset $D_m$ according to the target of interest $TOI_{(n,m)}$ to derive the working dataset $W_m$ and performs an operation on the working dataset $W_m$ according to the prime column names of the related tabular dataset $D_m$. In addition, the processor 15 of the data exploration apparatus DP1 (i.e., the one that the user interactively operates) refreshes the working scene $S_m$ on the display device 13. If the data exploration apparatus that stores the tabular datasets $D_n$ and $D_m$ is not the data exploration apparatus DP1, the information that will be shown on the working scene $S_m$ will be transmitted to the data exploration apparatus DP1 via the transceiving interfaces of both data exploration apparatuses. In the asynchronous mode, the working scene $S_n$ and the working scene $S_m$ are switchable on the display device 13 of the data exploration apparatus DP1 and can be operated by the user independently.

Figure 8:
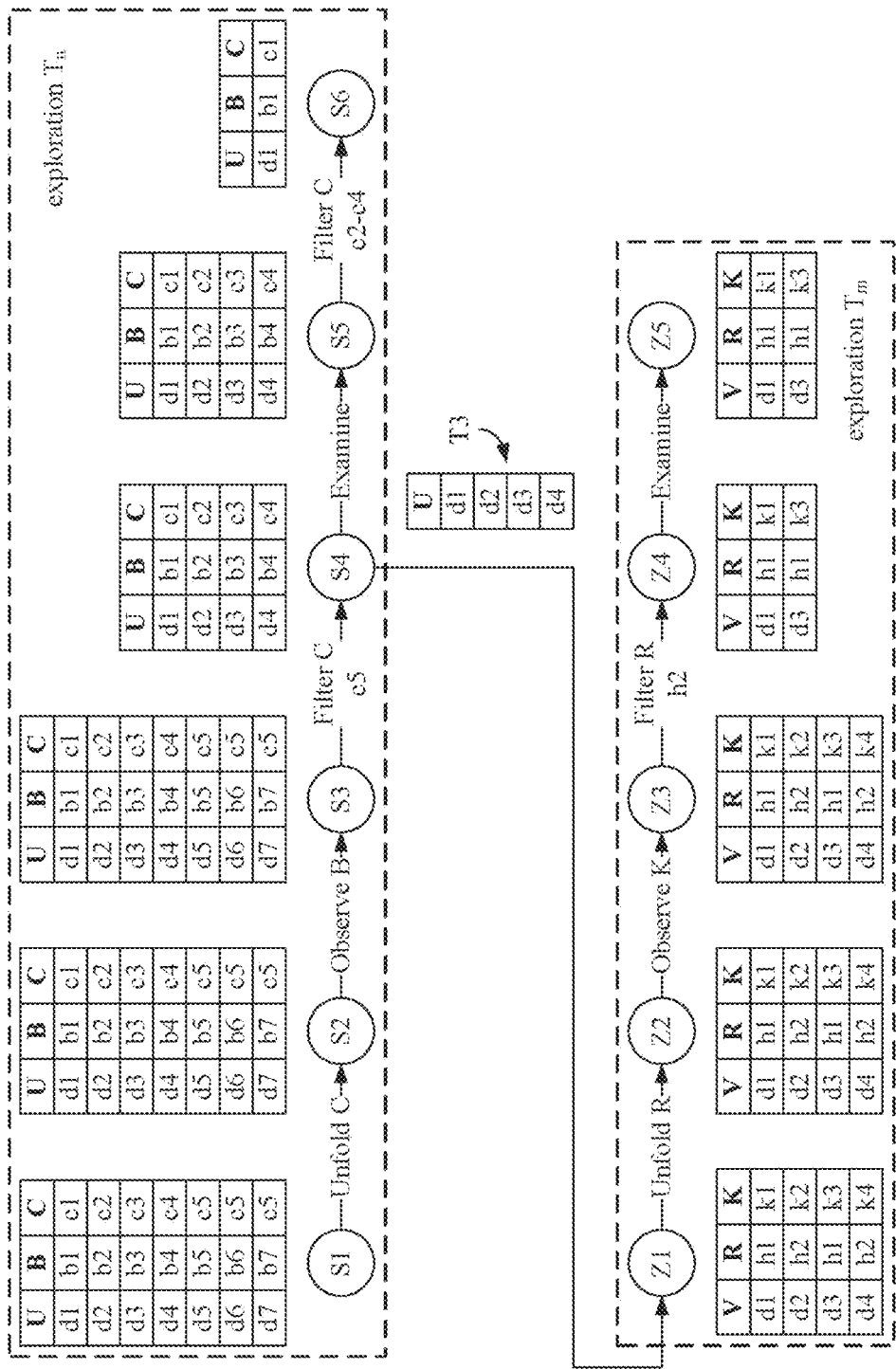
FIG. 8 illustrates an exemplary dataflow for cross-dataset data exploration on the same DP in asynchronous mode.

Please refer to FIG. 8 for an exemplary dataflow for cross-dataset data exploration on the same DP in asynchronous mode. In FIG. 8, the states S1, S2, S3, S4, S5, and S6 and their corresponding working datasets belong to the exploration $T_n$, while the states Z1, Z2, Z3, Z4, and Z5 and their corresponding working datasets belong to the exploration $T_m$.

During the exploration $T_n$, the user shows an interest on a related tabular dataset $D_m$ at the state S4. In response to the user's interest, the data exploration apparatus that stores the tabular datasets $D_n$ and $D_m$ generates the target of interest $TOI_{(n,m)}$ (i.e., the target of interest T3 in FIG. 8), runs the exploration $T_m$ to filter the related tabular dataset $D_m$ according to the target of interest $TOI_{(n,m)}$ to derive the working dataset Wm, and performs an operation on the working dataset $W_m$ according to the prime column names of the related tabular dataset $D_m$. As this is the asynchronous mode, the working scene $S_n$ and the working scene $S_m$ are switchable on the display device 13 of the data exploration apparatus DP1 and can be operated by the user independently. Hence, even if the exploration $T_m$ has been launched and run, the user can still continue the exploration $T_n$ from the state S4 to the state S5, and so on. As shown in FIG. 8, the exploration $T_n$ and the exploration $T_m$ are performed independently.

Cross-Dataset Data Exploration on the Same DP; Synchronous Mode

In some embodiments, the tabular dataset $D_n$ and the related tabular dataset $D_m$ are stored in the same data exploration apparatus and the explorations $T_n$ and $T_m$ are performed synchronously. Please note that the data exploration apparatus that stores the tabular datasets $D_n$ and $D_m$ may be the one that the user interactively operates (i.e., the data exploration apparatus DP1) or other data exploration apparatus.

In those embodiments, the processor of the data exploration apparatus that stores the tabular datasets $D_n$ and $D_m$ runs the exploration $T_m$ to filter the related tabular dataset $D_m$ according to the target of interest $TOI_{(n,m)}$ to derive the working dataset $W_m$ and performs an operation on the working dataset $W_m$ according to the prime column names of the related tabular dataset $D_m$. In addition, the processor 15 of the data exploration apparatus DP1 (i.e., the one that the user interactively operates) refreshes the working scene $S_m$ on the display device 13. If the data exploration apparatus that stores the tabular datasets $D_n$ and $D_m$ is not the data exploration apparatus DP1, the information that will be shown on the working scene $S_m$ will be transmitted to the data exploration apparatus DP1 via the transceiving interfaces of both data exploration apparatuses. In the synchronous mode, the processor of the data exploration apparatus that stores the tabular datasets $D_n$ and $D_m$ further suspends the exploration $T_n$ while the exploration $T_m$ is active.

In those embodiments, in response to a quit action on the working scene $S_m$ (e.g., clicking a button on the working scene $S_m$) to end the exploration $T_m$, the processor of the data exploration apparatus that stores the tabular datasets $D_n$ and $D_m$ generates a result of target $ROT_m$ for the target of interest $TOI_{(n,m)}$. The result of target $ROT_m$ is generated from the working dataset $W_m$ before the end of the exploration $T_m$ to include a table of processed data corresponding to the distinct data values of the target of interest $TOI_{(n,m)}$. The columns of the processed data can be predefined or hinted by the columns being observed or examined. The processor of the data exploration apparatus that stores the tabular datasets $D_n$ and $D_m$ updates the working dataset $W_n$ by integrating the result of target $ROT_m$ with the working dataset $W_n$ according to the distinct data values of the target of interest $TOI_{(n,m)}$, resumes the exploration $T_n$, and performs an operation on the working dataset $W_n$ according to the distinct data values of the target of interest $TOI_{(n,m)}$. In addition, the processor 15 of the data exploration apparatus DP1 (i.e., the one that the user interactively operates) enables the display device 13 to switch back to the working scene $S_n$.

Figure 9:
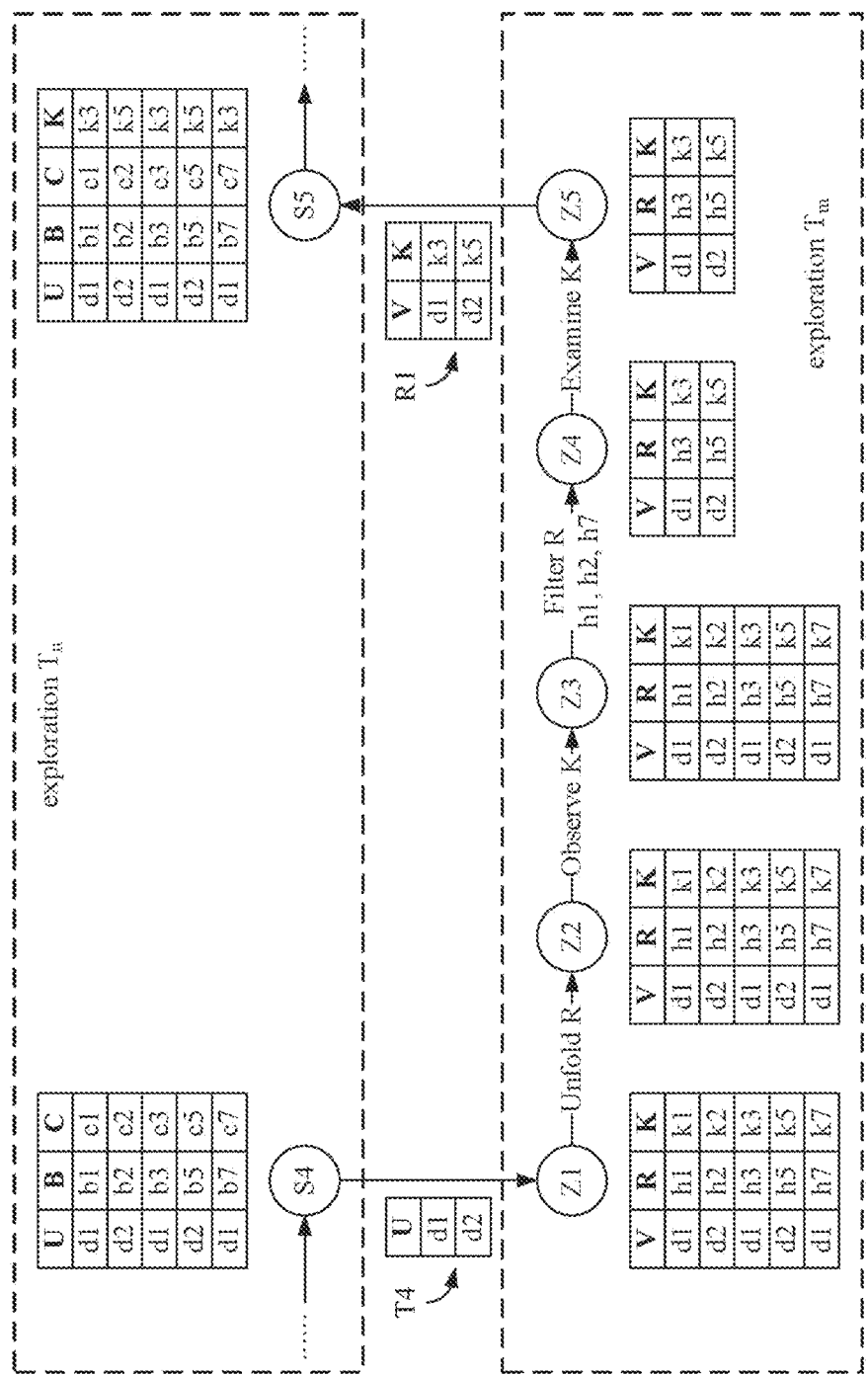
FIG. 9 illustrates an exemplary dataflow for cross-dataset data exploration on the same DP in synchronous mode.

Please refer to FIG. 9 for an exemplary dataflow for cross-dataset data exploration on the same DP in synchronous mode. In FIG. 9, the states S4 and S5 and their corresponding working datasets belong to the exploration $T_n$, while the states Z1, Z2, Z3, Z4, and Z5 and their corresponding working datasets belong to the exploration $T_m$.

During the exploration $T_n$, the user shows an interest on a related tabular dataset $D_m$ at the state S4. In response to the user's interest, the data exploration apparatus that stores the tabular datasets $D_n$ and $D_m$ generates the target of interest $TOI_{(n,m)}$ (i.e., the target of interest T4 in FIG. 9), runs the exploration $T_m$ to filter the related tabular dataset $D_m$ according to the target of interest $TOI_{(n,m)}$ to derive the working dataset Win, and performs an operation on the working dataset $W_m$ according to the prime column names of the related tabular dataset Din. As this is the synchronous mode, the exploration $T_n$ is suspended and only the exploration $T_m$ is active.

During the exploration $T_m$, a quit action is triggered on the working scene $S_m$ at the state Z5. In response to this quit action, the data exploration apparatus that stores the tabular datasets $D_n$ and $D_m$ generates the result of target $ROT_m$ (i.e., the result of target R1 shown in FIG. 9) and then updates the working dataset $W_n$ by integrating the result of target $ROT_m$ (i.e., the result of target R1) with the working dataset $W_n$ corresponding to the state S4. Afterwards, the exploration $T_n$ is resumed and the display device 13 of the data exploration apparatus DP1 switches back to the working scene $S_n$.

Cross-Planet Data Exploration; Synchronous Mode

In some embodiments, the tabular dataset $D_n$ and the related tabular dataset $D_m$ are stored in different data exploration apparatuses DP3 and DP4 respectively and the explorations $T_n$ and $T_m$ are performed in the synchronous mode. Data exploration apparatuses DP3 and DP4 are two independent data exploration apparatuses. Please note that, in some embodiments, the tabular dataset $D_n$ and/or the related tabular dataset $D_m$ may be or may not be stored in the data exploration apparatus DP1.

In those embodiments, the data exploration apparatus DP3 is configured to transmit the target of interest $TOI_{(n,m)}$ and the prime column names of the related tabular dataset $D_m$ to the data exploration apparatus DP4 so that the data exploration apparatus DP4 runs the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$. As this is the synchronous mode, the exploration $T_n$ is suspended while the exploration $T_m$ is active in the data exploration apparatus DP4 and the working scene $S_m$ is operated by the user on the display device 13 of the data exploration apparatus DP1.

In those embodiments, a quit instruction is transmitted to the data exploration apparatus DP4 in response to a quit action on the working scene $S_m$ to end the exploration $T_m$. The data exploration apparatus DP3 receives a result of target $ROT_m$ for the target of interest $TOI_{(n,m)}$ from the data exploration apparatus DP4, wherein the result of target $ROT_m$ is derived from the working dataset $W_m$ before the end of the exploration $T_m$ to include a table of processed data corresponding to the distinct data values of the target of interest $TOI_{(n,m)}$. The columns of the processed data can be predefined or hinted by the columns being observed or examined. The data exploration apparatus DP3 updates the working dataset $W_n$ by integrating the result of target $ROT_m$ with the working dataset $W_n$ according to the distinct data values of the target of interest $TOI_{(n,m)}$, resumes the exploration $T_n$, and performs an operation on the working dataset $W_n$ according to the distinct data values of the target of interest $TOI_{(n,m)}$. In addition, the processor 15 of the data exploration apparatus DP1 enables the display device 13 to switch back to the working scene $S_n$.

An exemplary dataflow for cross-planet data exploration in synchronous mode is similar to the one shown in FIG. 9. Nevertheless, for cross-planet data exploration in synchronous mode, the explorations $T_n$ and $T_m$ are performed in the data exploration apparatus DP3 and DP4 respectively.

The purpose of having cross-planet data exploration in synchronous mode is to ignite the power of cross-analyzing two or more independent tabular datasets, managed by different data owners and located far away in heterogeneous environments. It enables spontaneous as well as planned data queries (e.g., descriptive analysis) across various data planets without the need to share or unify raw data, thus protecting data from being copied or compromised. At the heart of cross-analysis over data planets is the concept of "transplore," which stands for transcending space and time to explore. It takes place during an exploration to escape the confines of the current data planet into other data planets to analyze the cross-related datasets. A transplation is not just a remote visit, but a remote expedition to a cluster of unknown but somehow related data planets. Such a journey is referred to as a cross-planet data exploration or simply worldwide data exploration.

Figure 10:
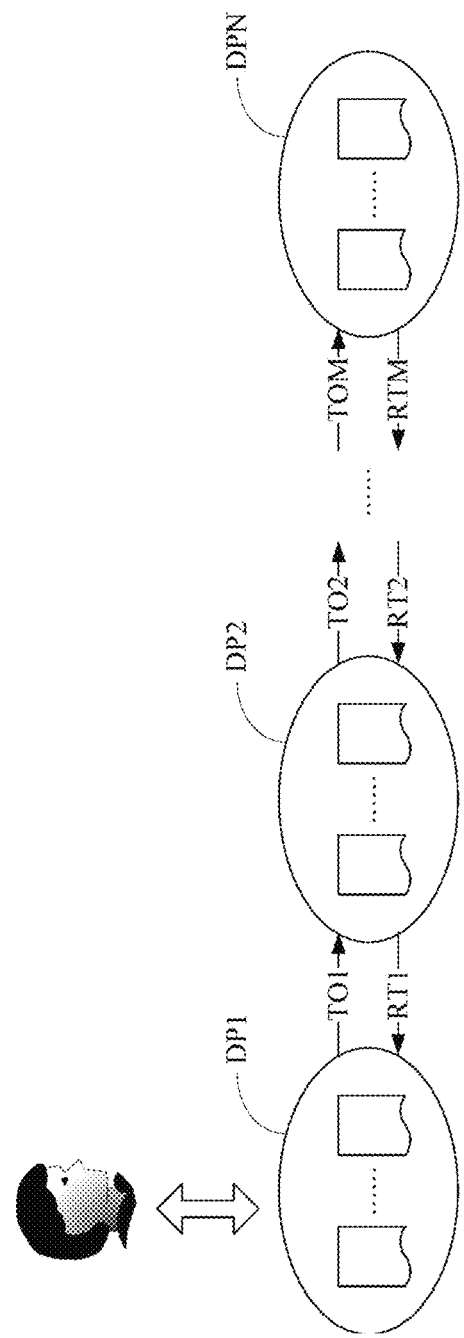
FIG. 10 illustrates the concept of transplore according to the present invention.

When the user seeks for additional information regarding the targets of interest, he or she transplores into a cluster of data exploration apparatus DP1, DP2, . . . , DPN for answers as shown in FIG. 10. The transploration carries the minimal information about a target of interest (e.g., the target of interests TO1, TO2, . . . , TOM) and hopefully bring back the result of the target of interest (e.g., the result of the target of interest RT1, RT2, . . . , RTM). However, if the first related data planet is unable to answer, it may choose to transplore to a second data planet, and so on until it finds the needed information or gives up and returns from the expedition.

The present invention also provides a cascading data exploration method for use in a cascading data exploration system including at least one data exploration apparatus, wherein a first data exploration apparatus (e.g., the data exploration apparatus DP1) of the at least one data exploration apparatus is interactively operated by a user conducting a mission including a plurality of explorations, $T_1$, $T_2$, . . . , $T_N$, to cross-analyze a plurality of tabular datasets, $D_1$, $D_2$, . . . , $D_N$, respectively, the first data exploration apparatus stores the tabular dataset $D_1$ and has a display device to interface with the user.

Figure 11:
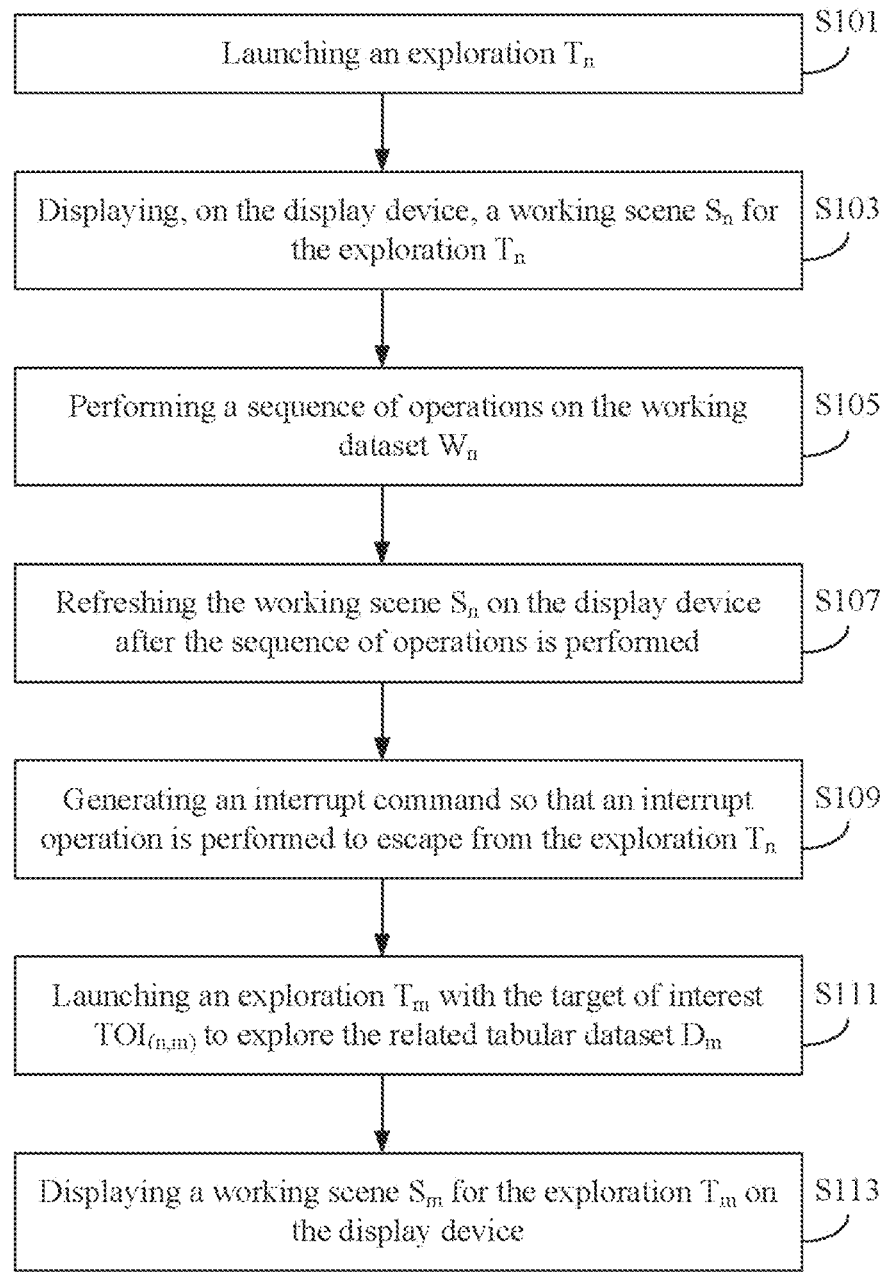
FIG. 11 illustrates the main flowchart of a cascading data exploration method in some embodiments of the present invention.

FIG. 11 illustrates the main flowchart of a cascading data exploration method in some embodiments of the present invention. The cascading data exploration method starts with n=1 in response to the initiation of the mission. For each of the explorations $T_1$, $T_2$, . . . , $T_N$, the cascading data exploration method includes the steps S101 to S113.

In step S101, an exploration $T_n$ is launched by the first data exploration apparatus. The exploration $T_n$ is a task with an optional filter to explore a tabular dataset $D_n$. A working dataset $W_n$ for the exploration $T_n$ to operate on is initially derived by applying the filter to the tabular dataset $D_n$ or from the tabular dataset $D_n$ if no filter is provided. It is noted that the working dataset $W_n$ is generated by the data exploration apparatus that stores the tabular dataset $D_n$.

In step S103, a working scene $S_n$ for the exploration $T_n$ is displayed on the display device of the first data exploration apparatus (i.e., the one that the user interactively operate). The working scene $S_n$ includes a statistic graph for the working dataset $W_n$, a plurality of column names of the tabular dataset $D_n$, a plurality of GUI action elements, and a plurality of column names of a related tabular dataset $D_m$ if the related tabular dataset $D_m$ is specified. A first related column group of the tabular dataset $D_n$ and a second related column group of the related tabular dataset $D_m$ have the same meaning and the same data representation format.

Step S105 and step S107 are executed in response to a sequence of selections of the GUI action elements and the column names of the tabular dataset $D_n$ from the working scene $S_n$. In step S105, a sequence of operations on the working dataset $W_n$ is performed by the data exploration apparatus that stores the tabular dataset $D_n$. In step S107, the working scene $S_n$ on the display device of the first data exploration apparatus (i.e., the one that the user interactively operate) is refreshed after the sequence of operations is performed.

Step S109, step S111, and step S113 are executed in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names.

In step S109, an interrupt command is generated by the first data exploration apparatus (i.e., the one that the user interactively operate) so that an interrupt operation to escape from the exploration $T_n$ is performed by the data exploration apparatus that stores the tabular dataset $D_n$. In addition, the data exploration apparatus that stores the tabular dataset $D_n$ generates a target of interest $TOI_{(n,m)}$ from the working dataset $W_n$ to include distinct data values of the first related column group of the tabular dataset $D_n$. In step S111, an exploration $T_m$ with the target of interest $TOI_{(n,m)}$ to explore the related tabular dataset $D_m$ is launched by the first data exploration apparatus (i.e., the one that the user interactively operate). The target of interest $TOI_{(n,m)}$ is a filter applied to the related tabular dataset $D_m$ to derive a working dataset $W_m$ for the exploration $T_m$, and a subset of the related tabular dataset $D_m$ with data values of the second related column group of the related tabular dataset $D_m$ contained in the target of interest $TOI_{(n,m)}$. In step S113, a working scene $S_m$ for the exploration $T_m$ is displayed on the display device of the first data exploration apparatus (i.e., the one that the user interactively operate).

In addition to the previously mentioned steps, the cascading data exploration method provided by the present invention can also execute all the operations and steps that can be executed by the aforesaid cascading data exploration system, have the same functions as the aforesaid cascading data exploration system, and deliver the same technical effects the aforesaid cascading data exploration system. How the cascading data exploration method provided by the present invention executes these operations and steps, has the same functions, and delivers the same technical effects as the aforesaid cascading data exploration system will be readily appreciated by a person having ordinary skill in the art based on the above explanation of the aforesaid cascading data exploration system, and thus will not be further described herein.

The cascading data exploration method provided by the present invention may be implemented as a computer program including a plurality of codes. The computer program is stored in a non-transitory computer readable storage medium. After the codes of the computer program are loaded into a cascading data exploration system (e.g., the aforesaid cascading data exploration system), the computer program executes the cascading data exploration method as described above. The non-transitory computer readable storage medium may be an electronic product, such as a Read Only Memory (ROM), a flash memory, a floppy disk, a hard disk, a Compact Disk (CD), a Digital Versatile Disc (DVD), a mobile disk, a database accessible to networks, or any other storage media with the same function and well-known to a person having ordinary skill in the art.

It shall be appreciated that, in the specification and the claims of the present invention, some terms (including related column group) are preceded by the terms "first" or "second." Please note that the terms "first" and "second," and "third" are used only for distinguishing different terms. If the order of these terms is not specified or cannot be derived from the context, the order of these terms is not limited by the preceded "first" and "second."

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data exploration apparatus, being interactively operated by a user conducting a mission comprising a plurality of explorations, $T_1, T_2, \ldots, T_N$, to cross-analyze a plurality of tabular datasets, $D_1, D_2, \ldots, D_N$, respectively, the data exploration apparatus comprising:
   at least one storage device, being configured to store the tabular dataset $D_1$;
   a display device, being configured to interface with the user; and
   at least one processor, being electrically connected to the at least one storage device and the display device and configured to:
   start with n=1 in response to the initiation of the mission to
   (1) launch an exploration $T_n$, and the exploration $T_n$ is a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided,
   (2) enable the display device to display a working scene $S_n$ for the exploration $T_n$, wherein the working scene $S_n$ comprises a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format, in response to a sequence of selections of the GUI action elements and the column names of the tabular dataset $D_n$ from the working scene $S_n$, perform a sequence of operations on the working dataset $W_n$ and refresh the working scene $S_n$ after the sequence of operations is performed, in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names, (1) generate an interrupt command so that an interrupt operation is performed to escape from the exploration $T_n$, wherein a target of interest $TOI_{(n,m)}$ is derived from the working dataset $W_n$ to comprise distinct data values of the first related column group of the tabular dataset $D_n$, (2) launch an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$, and (3) enable the display device to display a working scene $S_m$ for the exploration $T_m$.

2. The data exploration apparatus of claim 1, wherein the tabular dataset $D_n$ and the related tabular dataset $D_m$ are stored in a $p^{th}$ data exploration apparatus, wherein the $p^{th}$ data exploration apparatus is configured to run the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$, wherein the at least one processor is configured to refresh the working scene $S_m$, wherein the working scene $S_n$ and the working scene $S_m$ are switchable on the display device and can be operated by the user independently.

3. The data exploration apparatus of claim 1, wherein the tabular dataset $D_n$ and the related tabular dataset $D_m$ are stored in a $p^{th}$ data exploration apparatus, wherein the $p^{th}$ data exploration apparatus is configured to run the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$, and wherein the at least one processor is configured to refresh the working scene $S_m$, wherein the $p^{th}$ data exploration apparatus is further configured to suspend the exploration $T_n$ while the exploration $T_m$ is active.

4. The data exploration apparatus of claim 3, wherein in response to a quit action on the working scene $S_m$ to end the exploration $T_m$, the $p^{th}$ data exploration apparatus is further configured to:

generate a result of target $ROT_m$ for the target of interest $TOI_{(n,m)}$, wherein the result of target $ROT_m$ is generated from the working dataset $W_m$ before the end of the exploration $T_m$ to comprise a table of processed data corresponding to the distinct data values of the target of interest $TOI_{(n,m)}$, update the working dataset $W_n$ by integrating the result of target $ROT_m$ with the working dataset $W_n$ according to the distinct data values of the target of interest $TOI_{(n,m)}$, resume the exploration $T_n$, and perform an operation on the working dataset $W_n$ according to the distinct data values of the target of interest $TOI_{(n,m)}$, and wherein the at least one processor is further configured to enable the display device to switch back to the working scene $S_n$.

5. The data exploration apparatus of claim 1, wherein the tabular dataset $D_n$ and the related tabular dataset $D_m$ are stored in a $p^{th}$ data exploration apparatus and a $q^{th}$ data exploration apparatus respectively, wherein the $p^{th}$ data exploration apparatus is configured to transmit the target of interest $TOI_{(n,m)}$ and the prime column names of the related tabular dataset $D_m$ to the $q^{th}$ data exploration apparatus so that the $q^{th}$ data exploration apparatus runs the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$, wherein the exploration $T_n$ is suspended while the exploration $T_m$ is active in the $q^{th}$ data exploration apparatus and the working scene $S_m$ is operated by the user on the display device of the data exploration apparatus.

6. The data exploration apparatus of claim 5, wherein a quit instruction is transmitted to the $q^{th}$ data exploration apparatus in response to a quit action on the working scene $S_m$ to end the exploration $T_m$, wherein the $p^{th}$ data exploration apparatus is configured to receive a result of target $ROT_m$ for the target of interest $TOI_{(n,m)}$ from the $q^{th}$ data exploration apparatus, wherein the result of target $ROT_m$ is derived from the working dataset $W_m$ before the end of the exploration $T_m$ to comprise a table of processed data corresponding to the distinct data values of the target of interest $TOI_{(n,m)}$, wherein the $p^{th}$ data exploration apparatus is further configured to update the working dataset $W_n$ by integrating the result of target $ROT_m$ with the working dataset $W_n$ according to the distinct data values of the target of interest $TOI_{(n,m)}$, resume the exploration $T_n$, and perform an operation on the working dataset $W_n$ according to the distinct data values of the target of interest $TOI_{(n,m)}$, wherein the at least processor is further configured to enable the display device to switch back to the working scene $S_n$.

7. The data exploration apparatus of claim 1, wherein the target of interest $TOI_{(n,m)}$ further comprises data of at least one other column in the working dataset $W_n$.

8. A cascading data exploration method for use in a cascading data exploration system comprising at least one data exploration apparatus, wherein a first data exploration apparatus of the at least one data exploration is interactively operated by a user conducting a mission comprising a plurality of explorations, $T_1, T_2, \ldots, T_N$, to cross-analyze a plurality of tabular datasets, $D_1, D_2, \ldots, D_N$, respectively, the first data exploration apparatus stores the tabular dataset $D_1$ and has a display device to interface with the user, and the cascading data exploration method comprises the following steps:

starting with n=1, in response to the initiation of the mission, for the following steps:

launching an exploration $T_n$, and the exploration $T_n$ being a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided;

displaying, on the display device, a working scene $S_n$ for the exploration $T_n$, wherein the working scene $S_n$ comprises a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format;

wherein the cascading data exploration method further comprises the following steps in response to a sequence of selections of the GUI action elements and the column names of the tabular dataset $D_n$ from the working scene $S_n$:

performing a sequence of operations on the working dataset $W_n$; and refreshing the working scene $S_n$ on the display device after the sequence of operations is performed;

wherein the cascading data exploration method further comprises the following steps in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names:

generating an interrupt command so that an interrupt operation is performed to escape from the exploration $T_n$, wherein a target of interest $TOI_{(n,m)}$ is derived from the working dataset $W_n$ to comprise distinct data values of the first related column group of the tabular dataset $D_n$;

launching an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$; and displaying a working scene $S_m$ for the exploration $T_m$ on the display device.

9. The cascading data exploration method of claim 8, wherein the tabular dataset $D_n$ and the related tabular dataset $D_m$ are stored in a same data exploration apparatus among the at least one data exploration apparatus, and the cascading data exploration method further comprises the following steps:

running the exploration $T_m$ to filter the related tabular dataset $D_m$ according to the target of interest $TOI_{(n,m)}$ to derive the working dataset $W_m$;

performing an operation on the working dataset $W_m$ according to the prime column names of the related tabular dataset $D_m$; and refreshing the working scene $S_m$ displayed on the display device, wherein the working scene $S_n$ and the working scene $S_m$ are switchable on the display device and can be operated by the user independently.

10. The cascading data exploration method of claim 8, wherein the tabular dataset $D_n$ and the related tabular dataset $D_m$ are stored in a same data exploration apparatus among the at least one data exploration apparatus, and the cascading data exploration method further comprises the following steps:

running the exploration $T_m$ to filter the related tabular dataset $D_m$ according to the target of interest $TOI_{(n,m)}$ to derive the working dataset $W_m$;

performing an operation on the working dataset $W_m$ according to the prime column names of the related tabular dataset $D_m$;

refreshing the working scene $S_m$ displayed on the display device; and suspending the exploration $T_n$ while the exploration $T_m$ is active.

11. The cascading data exploration method of claim 10, wherein in response to a quit action on the working scene $S_m$ to end the exploration $T_m$, the cascading data exploration method further comprises the following steps:

generating a result of target $ROT_m$ for the target of interest $TOI_{(n,m)}$, wherein the result of target $ROT_m$ is generated from the working dataset $W_m$ before the end of the exploration $T_m$ to comprise a table of processed data corresponding to the distinct data values of the target of interest $TOI_{(n,m)}$;

updating the working dataset $W_n$ by integrating the result of target $ROT_m$ with the working dataset $W_n$ according to the distinct data values of the target of interest $TOI_{(n,m)}$, resume the exploration $T_n$;

performing an operation on the working dataset $W_n$ according to the distinct data values of the target of interest $TOI_{(n,m)}$; and enabling the display device to switch back to the working scene $S_n$.

12. The cascading data exploration method of claim 8, wherein the tabular dataset $D_n$ and the related tabular dataset $D_m$ are stored in a $p^{th}$ data exploration apparatus and a $q^{th}$ data exploration apparatus respectively, and the cascading data exploration method further comprises the following steps:

transmitting the target of interest $TOI_{(n,m)}$ and the prime column names of the related tabular dataset $D_m$ from the $p^{th}$ data exploration apparatus to the $q^{th}$ data exploration apparatus so that the $q^{th}$ data exploration apparatus runs the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$;

wherein the exploration $T_n$ is suspended while the exploration $T_m$ is active in the $q^{th}$ data exploration apparatus and the working scene $S_m$ is operated by the user on the display device of the first data exploration apparatus.

13. The cascading data exploration method of claim 12, further comprising the following steps:

transmitting a quit instruction to the $q^{th}$ data exploration apparatus in response to a quit action on the working scene $S_m$ to end the exploration $T_m$;

receiving, by the $p^{th}$ data exploration apparatus, a result of target $ROT_m$ for the target of interest $TOI_{(n,m)}$ from the $q^{th}$ data exploration apparatus, wherein the result of target $ROT_m$ is derived from the working dataset $W_m$ before the end of the exploration $T_m$ to comprise a table of processed data corresponding to the distinct data values of the target of interest $TOI_{(n,m)}$;

updating, by the $p^{th}$ data exploration apparatus, the working dataset $W_n$ by integrating the result of target $ROT_m$ with the working dataset $W_n$ according to the distinct data values of the target of interest $TOI_{(n,m)}$;

resuming, by the $p^{th}$ data exploration apparatus, the exploration $T_n$;

performing, by the $p^{th}$ data exploration apparatus, an operation on the working dataset $W_n$ according to the distinct data values of the target of interest $TOI_{(n,m)}$; and enabling, by the first data exploration apparatus, the display device to switch back to the working scene $S_n$.

14. The cascading data exploration method of claim 8, wherein the target of interest $TOI_{(n,m)}$ further comprises data of at least one other column in the working dataset $W_n$.

15. A non-transitory computer readable storage medium, storing a computer program comprising a plurality of codes, wherein the computer program executes a cascading data exploration method after the codes are loaded into a cascading data exploration system, a first data exploration apparatus of the cascading data exploration system is interactively operated by a user conducting a mission comprising a plurality of explorations, $T_1, T_2, \ldots, T_N$, to cross-analyze a plurality of tabular datasets, $D_1, D_2, \ldots, D_N$, respectively, the first data exploration apparatus stores the tabular dataset $D_1$ and has a display device to interface with the user, and the cascading data exploration method comprises the following steps:

starting with n=1, in response to the initiation of the mission, for the following steps:

launching an exploration $T_n$, and the exploration $T_n$ being a task with an optional filter to explore a tabular dataset $D_n$, wherein a working dataset $W_n$ for the exploration $T_n$ to operate on is initially derived by applying the filter to the tabular dataset $D_n$ or from the tabular dataset $D_n$ if no filter is provided;

enabling the display device to display a working scene $S_n$ for the exploration $T_n$, wherein the working scene $S_n$ comprises a statistic graph for the working dataset $W_n$, a plurality of column names of the tabular dataset $D_n$, a plurality of GUI action elements and a plurality of column names of a related tabular dataset $D_m$ if the related tabular dataset $D_m$ is specified, wherein a first related column group of the tabular dataset $D_n$ and a second related column group of the related tabular dataset $D_m$ have the same meaning and the same data representation format;

wherein the cascading data exploration method further comprises the following steps in response to a sequence of selections of the GUI action elements and the column names of the tabular dataset $D_n$ from the working scene $S_n$:

performing a sequence of operations on the working dataset $W_n$; and refreshing the working scene $S_n$ on the display device after the sequence of operations is performed;

wherein the cascading data exploration method further comprises the following steps in response to one of two GUI actions (a) a selection of a prime column name of the related tabular dataset $D_m$ from the working scene $S_n$ and (b) a selection of the related tabular dataset $D_m$, wherein the column names of the second related column group of the related tabular dataset $D_m$ are the prime column names:

generating an interrupt command so that an interrupt operation is performed to escape from the exploration $T_n$, wherein a target of interest $TOI_{(n,m)}$ is derived from the working dataset $W_n$ to comprise distinct data values of the first related column group of the tabular dataset $D_n$;

launching an exploration $T_m$ with the target of interest $TOI_{(n,m)}$ to explore the related tabular dataset $D_m$, wherein the target of interest $TOI_{(n,m)}$ is a filter applied to the related tabular dataset $D_m$ to derive a working dataset $W_m$ for the exploration $T_m$, a subset of the related tabular dataset $D_m$ with data values of the second related column group of the related tabular dataset $D_m$ contained in the target of interest $TOI_{(n,m)}$; and displaying a working scene $S_m$ for the exploration $T_m$ on the display device.

16. The non-transitory computer readable storage medium of claim 15, wherein the tabular dataset $D_n$ and the related tabular dataset $D_m$ are stored in a same data exploration apparatus among the at least one data exploration apparatus, and the cascading data exploration method further comprises the following steps:

running the exploration $T_m$ to filter the related tabular dataset $D_m$ according to the target of interest $TOI_{(n,m)}$ to derive the working dataset $W_m$;

performing an operation on the working dataset $W_m$ according to the prime column names of the related tabular dataset $D_m$; and refreshing the working scene $S_m$ displayed on the display device, wherein the working scene $S_n$ and the working scene $S_m$ are switchable on the display device and can be operated by the user independently.

17. The non-transitory computer readable storage medium of claim 15, wherein the tabular dataset $D_n$ and the related tabular dataset $D_m$ are stored in a same data exploration apparatus among the at least one data exploration apparatus, and the cascading data exploration method further comprises the following steps:

running the exploration $T_m$ to filter the related tabular dataset $D_m$ according to the target of interest $TOI_{(n,m)}$ to derive the working dataset $W_m$;

performing an operation on the working dataset $W_m$ according to the prime column names of the related tabular dataset $D_m$;

refreshing the working scene $S_m$ displayed on the display device; and suspending the exploration $T_n$ while the exploration $T_m$ is active.

18. The non-transitory computer readable storage medium of claim 17, wherein in response to a quit action on the working scene $S_m$ to end the exploration $T_m$, the cascading data exploration method further comprises the following steps:

generating a result of target $ROT_m$ for the target of interest $TOI_{(n,m)}$, wherein the result of target $ROT_m$ is generated from the working dataset $W_m$ before the end of the exploration $T_m$ to comprise a table of processed data corresponding to the distinct data values of the target of interest $TOI_{(n,m)}$;

updating the working dataset $W_n$ by integrating the result of target $ROT_m$ with the working dataset $W_n$ according to the distinct data values of the target of interest $TOI_{(n,m)}$, resume the exploration $T_n$;

performing an operation on the working dataset $W_n$ according to the distinct data values of the target of interest $TOI_{(n,m)}$; and enabling the display device to switch back to the working scene $S_n$.

19. The non-transitory computer readable storage medium of claim 15, wherein the tabular dataset $D_n$ and the related tabular dataset $D_m$ are stored in a $p^{th}$ data exploration apparatus and a $q^{th}$ data exploration apparatus respectively, and the cascading data exploration method further comprises the following steps:

transmitting the target of interest $TOI_{(n,m)}$ and the prime column names of the related tabular dataset $D_m$ from the $p^{th}$ data exploration apparatus to the $q^{th}$ data exploration apparatus so that the $q^{th}$ data exploration apparatus runs the exploration $T_m$ to filter the related tabular dataset $D_m$ according to the target of interest $TOI_{(n,m)}$ to derive the working dataset $W_m$ and perform an operation on the working dataset $W_m$ according to the prime column names of the related tabular dataset $D_m$;

wherein the exploration $T_n$ is suspended while the exploration $T_m$ is active in the $q^{th}$ data exploration apparatus and the working scene $S_m$ is operated by the user on the display device of the first data exploration apparatus.

20. The non-transitory computer readable storage medium of claim 19, wherein the cascading data exploration method further comprises the following steps:

transmitting a quit instruction to the $q^{th}$ data exploration apparatus in response to a quit action on the working scene $S_m$ to end the exploration $T_m$;

receiving, by the $p^{th}$ data exploration apparatus, a result of target $ROT_m$ for the target of interest $TOI_{(n,m)}$ from the $q^{th}$ data exploration apparatus, wherein the result of target $ROT_m$ is derived from the working dataset $W_m$ before the end of the exploration $T_m$ to comprise a table of processed data corresponding to the distinct data values of the target of interest $TOI_{(n,m)}$;

updating, by the $p^{th}$ data exploration apparatus, the working dataset $W_n$ by integrating the result of target $ROT_m$ with the working dataset $W_n$ according to the distinct data values of the target of interest $TOI_{(n,m)}$;

resuming, by the $p^{th}$ data exploration apparatus, the exploration $T_n$;

performing, by the $p^{th}$ data exploration apparatus, an operation on the working dataset $W_n$ according to the distinct data values of the target of interest $TOI_{(n,m)}$; and enable, by the first data exploration apparatus, the display device to switch back to the working scene $S_n$.

21. The non-transitory computer readable storage medium of claim 15, wherein the target of interest $TOI_{(n,m)}$ further comprises data of at least one other column in the working dataset $W_n$.

* * * * *